United States Patent
Van Dyke et al.

(10) Patent No.: US 11,101,905 B1
(45) Date of Patent: Aug. 24, 2021

(54) METHOD FOR ESTIMATING RADIATIVE CONTAMINATION AT NODES OF AN RF CIRCUIT

(71) Applicants: Keysight Technologies, Inc., Santa Rosa, CA (US); Keysight Technologies, Inc., Santa Rosa, CA (US)

(72) Inventors: Rulon Van Dyke, Siwamee, GA (US); Tong Zhou Wu, Atlanta, GA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/923,974

(22) Filed: Jul. 8, 2020

(51) Int. Cl.
*G06F 30/39* (2020.01)
*G06F 30/31* (2020.01)
*H04B 17/391* (2015.01)
*H04B 17/10* (2015.01)

(52) U.S. Cl.
CPC ....... *H04B 17/3912* (2015.01); *H04B 17/102* (2015.01); *H04B 17/3913* (2015.01)

(58) Field of Classification Search
CPC ...... G06F 30/31; G06F 30/33; G06F 30/3308; G06F 30/36; G06F 30/347; G06F 30/367; G06F 30/373; G06F 30/39; G06F 30/392; G06F 30/394
See application file for complete search history.

(56) References Cited

U.S. PATENT DOCUMENTS

| | | | |
|---|---|---|---|
| 7,206,731 B2 * | 4/2007 | Sercu | G06F 30/367 703/14 |
| 7,676,351 B2 | 3/2010 | Jandhyala | |
| 7,954,079 B2 | 5/2011 | Kim | |
| 8,583,070 B2 * | 11/2013 | Khazei | H04B 15/00 455/310 |
| 2011/0161064 A1 | 6/2011 | Song | |
| 2013/0212544 A1 * | 8/2013 | Yu | G06F 30/30 716/55 |
| 2013/0246990 A1 * | 9/2013 | Yen | G06F 30/367 716/112 |

* cited by examiner

*Primary Examiner* — Blane J Jackson

(57) ABSTRACT

A method for operating a data processing system to generate an estimate of radiative contamination at nodes in an RF circuit characterized by a plurality of circuit elements connected by metal traces on a circuit board are disclosed. The data processing system to receive information specifying a coupled radiation matrix based on the metal traces and a simulation of an RF circuit with the components connected by non-radiating nodes. The data processing system generates a coupled power list for at least one node of the model, each entry in the coupled power list includes a coupled power value indicating a power level received by EM radiation from another of the nodes.

8 Claims, 2 Drawing Sheets

METHOD FOR ESTIMATING RADIATIVE CONTAMINATION AT NODES OF AN RF CIRCUIT

BACKGROUND

Consider the problem of validating an RF module prior to committing that module to production. The module includes an RF circuit consisting of a number of packaged electronic components mounted on a printed circuit board (PCB) and connected by metal traces on that circuit board. Circuit simulators allow the designer to optimize the circuit prior to laying out the circuit on a PCB. However, once the circuit is laid out on a PCB, the radiative couplings between the metal traces on the circuit board can significantly alter the performance of the circuit because one or more of the metal traces radiate energy and can receive radiative energy from other traces. Thus, the signal at the input to one or more of the components can differ significantly from that predicted from the circuit simulator.

In principle, the contributions of the metal traces can be incorporated into the circuit simulation; however, the resultant simulation problem poses a significant computational load, and is also error-prone. For example, the details of the metal traces can be input into an electromagnetic (EM) simulator. The EM simulator generates an S-parameter model of the EM traces, which can then be introduced into the circuit simulation to replace the inter-component connections. Each metal trace has two ends. Even a simple circuit with eight metal traces must include 256 potential couplings, since each end can radiate energy to each of the other metal trace ends. In addition, each node would receive a copy of the EM spectrum from every other node through the couplings with the other nodes. The process is further complicated by the need to map the output of the EM simulator to the nodes of the circuit, which can be an error-prone process.

Finally, the results of such co-simulations are difficult to interpret. The designer can determine that the packaged system no longer meets the performance criteria for the system; however, determining which couplings are most significant, and how to reduce those couplings, still presents significant challenges.

SUMMARY

The present invention includes a method for operating a data processing system and a computer readable medium having instructions that cause a data processing system to execute that method. The method causes a data processing system to estimate radiative contamination in an RF circuit characterized by a plurality of circuit elements connected by metal traces on a circuit board prior to the production of that RF circuit. The method includes causing the data processing system to receive information specifying a coupled radiation matrix, the coupled radiation matrix specifying a fraction of an RF power at each of the metal traces that is radiated to each of the metal traces in the RF circuit. The method also causes the data processing system to receive a circuit model of the RF circuit with each of the metal traces replaced by a node having no radiated EM energy, the circuit model providing reflection coefficients looking into each circuit element connected to each node and a design power value for that node representing a power at that node when the model is powered by a test signal and to generate a coupled power list for at least one node of the circuit model, each entry in the coupled power list includes a coupled power value indicating a power level received by EM radiation from another of the nodes.

In one aspect, the coupled radiation matrix is generated from an output of an EM simulator operating on a layout model of the metal traces.

In another aspect, the method further includes causing the data processing system to identify one of the nodes for which a sum of the coupled power values for the one of the nodes is greater than a predetermined fraction of the design power value for that node.

In another aspect, the method further includes causing the data processing system to generate a coupled power list for each of the nodes of the circuit model, replace the design power value for each of the nodes by a sum of the coupled power values for that node and the design power value for that node, and generate a new coupled power list for at least one node of the circuit model, each entry in the new coupled power list includes a coupled power value indicating a power level received by EM radiation from another of the nodes.

DETAILED DESCRIPTION

Figure 1:
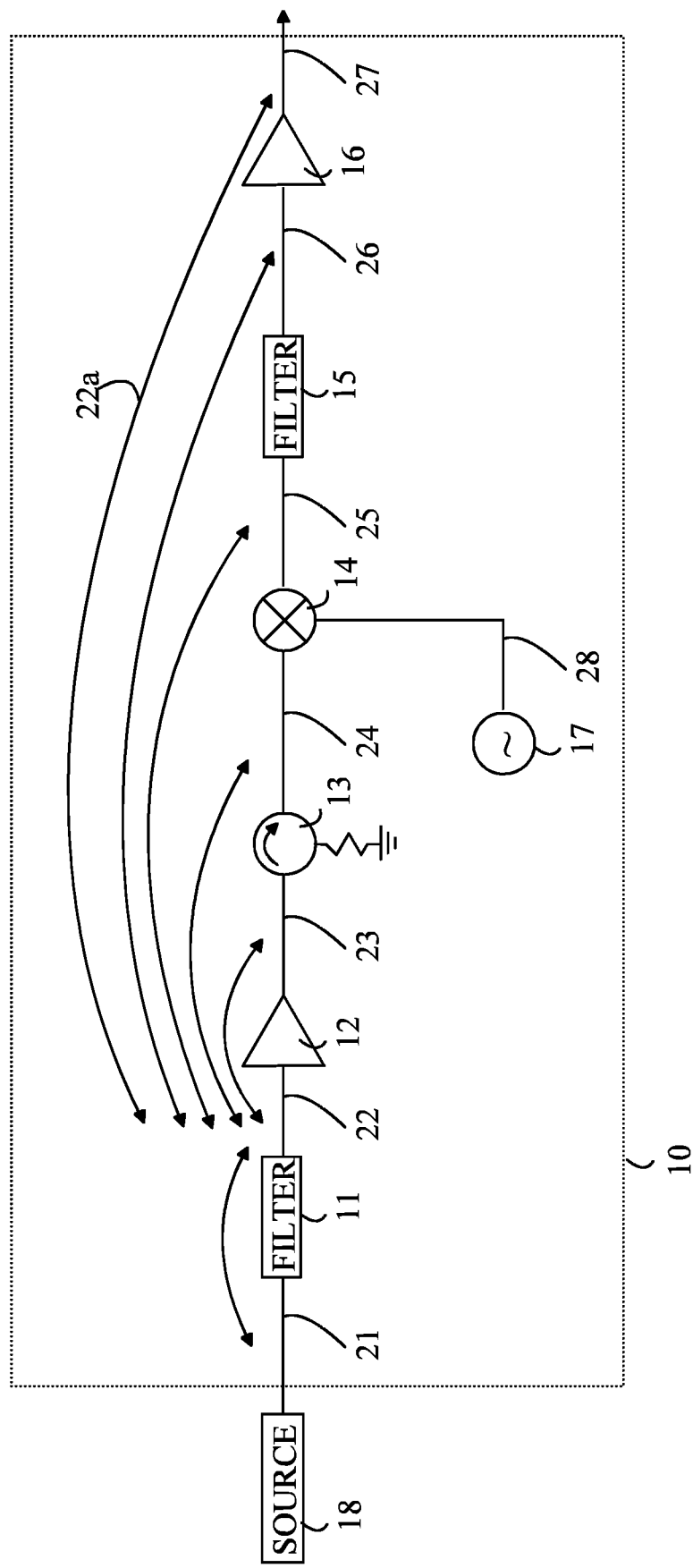
FIG. 1 illustrates an RF receiver that is driven from a source.

The manner in which the present invention provides its advantages can be more easily understood with reference to FIG. 1, which illustrates an RF receiver 10 that is driven from a source 18. The receiver consists of circuits 11-17 that are connected by metal traces 21-28. Initially, the designer simulates the circuit with the connections between the various components as ideal connections that do not radiate or absorb energy. These connection points will be referred to as nodes in the following discussion. When the circuit is laid out on a printed circuit board, the connections between the various components are made via metal traces 21-28 on the printed circuit board. These metal traces act as "antennae" that radiate and absorb RF energy. The couplings of trace 22 to the other traces are shown in the figure. An exemplary radiative coupling is shown at 22a. To simplify the drawing, the couplings between node 22 and node 28 and the couplings between the other pairs of nodes have been omitted. Hence, the input to any of the elements is the sum of the intended signal plus all of the radiative inputs that are absorbed by the printed circuit trace providing the input to that component less all of the losses due to radiation from that trace. For example, the input to filter 15 is the sum of the signals radiated from traces 21-24, and 26-27 that are received on trace 25, as well as the signal from mixer 14 less power radiated to other nodes. It should be noted that the radiated signals may have a significantly different frequency spectrum relative to the desired frequency spectrum for the intended component.

In general, the goal of the circuit designer is to provide a layout of the circuit in which the signals that are input to each circuit element are essentially the signals that would be received by that circuit element if there were no radiative couplings. The signals that would be present at each node in the absence of radiative couplings can be ascertained by a conventional circuit simulator.

Typically, the circuit designer utilizes a circuit simulator in a circuit model in which there are no radiative couplings in designing the circuit. Ideally, the circuit after layout has substantially the ideal signals at the nodes. If, at the layout stage, the signal at a node differs significantly from the signal provided by the circuit simulator due to radiative couplings there is a layout problem. In such cases, a knowledge of which couplings are causing the problem would be useful.

The present invention utilizes the observation that a precise measurement of the radiative interference is not necessary for most applications. If it can be determined at a pre-production state that a particular radiative coupling is causing a significant change in the signal at the input of one of the circuit elements, the designer will need to redesign the layout to reduce that coupling. Once the interfering signals are determined to be a significant fraction of the desired signal at a node, the redesign process is triggered knowing that the precise level of interference may not provide further insight into the need for redesign or the identity of which trace is causing the problem.

Consider two nodes in the circuit. Assume that the first node, referred to as the "source node" radiates power to the second node, referred to as the "receiving node". The amount of power radiated by the source node depends on the magnitude of the signal on the source node. The amount of power received by the receiving node is this power multiplied by the level of coupling between the two nodes. In one aspect of the present invention, the level of power at the source node is approximated by the power at that node provided by a circuit simulator operating on a model circuit in which none of the nodes radiates power. The coupling between the nodes is approximated by utilizing an EM simulator operating on the layout traces.

EM simulators compute the couplings between ports on the traces. Typically, each trace is assigned port numbers that are associated with the points on the traces at which the trace is connected to some component. In the case of the traces shown in FIG. 1, each trace would have two port numbers, as each trace only connects one component to a single other component. The EM simulator generates an S-parameter matrix providing the S-parameters for each of the possible port-to-port connections selected by the user.

In one aspect, the present invention only requires the node-to-node couplings. These couplings can be derived from the EM simulator port-to-port couplings. Typically, the difference between the conducted energy between the two ports of a single metal trace is small, since the trace is typically a good conductor. Hence since the difference between the metal trace ports is small, the resulting port-to-port coupling matrix is a good approximation of the node-to-node couplings.

The system of the present disclosure avoids this complex EM/circuit co-simulation mentioned above by splitting the problem into two independent parts and using the computed signal power along the signal path from the simulation of a behavioral model whose nodes do not radiate EM energy. The model provides information on the power at each node in the absence of EM radiation and the characteristics of the circuit components that are connected at the nodes. The S-parameters derived from the EM simulator provides a coupling matrix that provides information about the changes in the power at the nodes that results from EM radiation from the various metal traces. This information provides insight into which couplings are causing the problems so that the user can alter the physical layout to reduce the couplings in question. When the layout changes, the EM simulation will need to be re-run; however, the behavioral model results may still be accurate, and hence, no additional circuit simulation may be needed. The new EM data is then used to understand the improvement in the signal path performance by computing a new power distribution list.

In one aspect, the input to each circuit component on the circuit board is determined from two values. The first is the desired signal it receives from its adjacent circuit component through the metal trace responsible for that connection. The second is the interference signals that the component receives via EM radiation from other traces on the circuit board less the signal that is radiated from the connecting trace. If the radiative interference gains and losses at the input to a component are a significant fraction of the power of the ideal signal at that input, then there is a problem in the layout on the circuit board that needs to be addressed. In one aspect of the present invention, the power contribution at the input of a circuit component resulting from the radiation from the various traces in the circuit is estimated. The estimation can then be used to identify the traces that must be altered to move the circuit design closer to the ideal circuit.

The circuit simulator provides two types of information in the method of the present disclosure. The first is the power at each node of the model circuit when the circuit is powered by a source specified in the model. The second are the reflection coefficients looking into each component connected to a node. Typically the signal path is one input to one output but some multiple components are connected to a trace for biasing or other purposes.

In this aspect, a system circuit simulator calculates the desired signal power along the signal path at each component. At the system level, ideal connections are used to connect components. These ideal connections do not couple to each other and are lossless. In a physical layout, these components are connected through metal traces rather than ideal connections. Given the desired signal power, the calculated reflection coefficient from each node in the circuit simulation and the EM coupling data from all the metal traces, the coupled power to any node can be determined. These coupled results show the relationship between every node to every other node in the system. The performance of the system is determined by comparing the total radiated coupled power versus the desired signal power. If the coupled power is a significant fraction of the desired signal power at a node, the PCB board layout may need to be redesigned. At what point the coupled power is a "significant fraction" will depend on the particular circuit and design criteria.

In one exemplary embodiment, an Estimated Packaging Power matrix, $EPP_{n,m}$ is defined $$EPP_{n,m} = DCP_m GT_{n,m}$$

where $$GT_{n,m} = \frac{(1 - |\Gamma_G|^2)|S_{n,m}|^2(1 - |\Gamma_L|^2)}{|(1 - S_{m,m}\Gamma_G)(1 - S_{n,n}\Gamma_L) - S_{m,n}S_{n,m}\Gamma_G\Gamma_L|^2}$$

Here, m is the source node and n is the destination node; S is the S-parameter matrix derived from the EM simulation and $\Gamma_L$ is the reflection coefficient looking into the load connected to node n and $\Gamma_G$ the reflection coefficient looking into the generator or source connected to node m.

Figure 2:
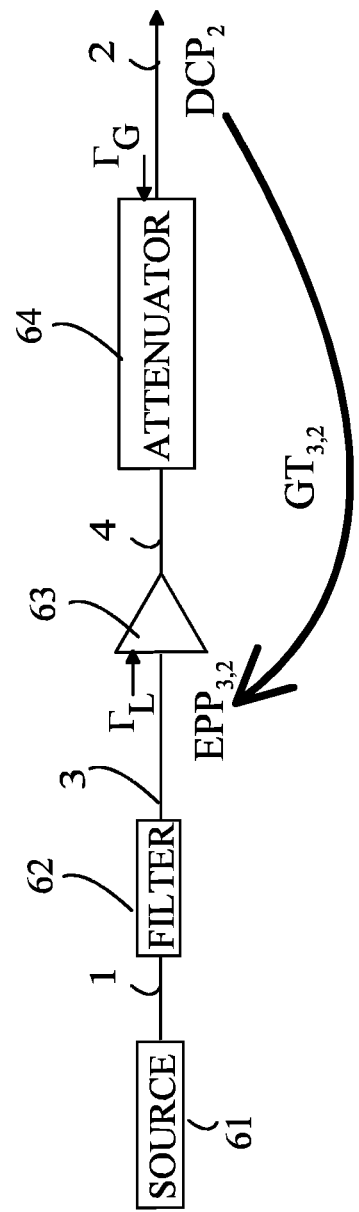
FIG. 2 illustrates the computation of one of the estimated package power (EPP) values for a simple circuit having three components

Refer now to FIG. 2, which illustrates the computation of one of the EPP values for a simple circuit having three components. The circuit consists of a filter 62, RF amplifier 63, and an attenuator 64. The circuit is powered from a signal source 61. In the example shown in the figure, the radiative contribution from node 2 received by node 3 is computed. The circuit simulator provides the conducted $DCP_2$ at node 2. The circuit simulator also provides the value for $\Gamma_L$ looking into amplifier 63 and the value of $\Gamma_G$ looking into attenuator 64. The value of $GT_{32}$ depends on the coupling constants $S_{3,2}$, $S_{2,3}$, $S_{2,2}$ and $S_{3,3}$ obtained from the EM simulator.

The total radiative interference at node n is given by $$EPP_{n,total} = \sum_{m=0}^{M-1} Epp_{n,m}$$

where M is the number of nodes in the portion of the design being simulated. The ratio of Desired Channel Power (DCP) at each node to the $EPP_{total}$ for that node is a measure of the EM Carrier to Interference (EM_CI) ratio for the node. If this ratio is less than some predetermined threshold value, the trace or traces that contribute the most to $EPP_{total}$ for that node can be examined. Hence, the system of the present disclosure allows the user to quickly zero in on traces that are causing problems and redesign those areas of the PCB layout to reduce the problems. It should be noted that these measurements are made for a particular frequency, and hence, may be repeated at a number of frequencies of interest for the circuit being examined.

The above-described embodiments estimate the radiative power received at each node in the circuit by coupling the desired power at all nodes from the circuit simulator utilizing the radiative couplings provided by an EM simulator. The power that is radiatively coupled to the other nodes is the interference packaging power captured by the EPP measurement. If the radiative power couplings are small, then this is a good approximation. If the radiative power couplings are a significant fraction of the design power, then EPP will contain errors that may be significant. The "correct" power at each node that drives the radiation to other nodes is design power plus the power received from other nodes minus the power radiated at that node. If the radiative losses and gains are a significant fraction of the design power at a node, the design power may no longer be a good approximation to the power available for radiation from that node. However, the results may still be useful in identifying the nodes that are most significant in corrupting the power at the node, and hence, guide the designer in making changes to the circuit layout.

If, however, a more precise estimate of EPP is required, the process can be iterated. In the first iteration, the power that is available for radiation at each node is the design power from the circuit simulator as described above. At each successive iteration, the power that is available is the total power at that node from the previous iteration.

The above-described embodiments utilize the design power at a specific frequency to diagnose radiative coupling issues. In circuits that include frequency conversion such as transmitters and receivers, the radiative power at any given node can be the result of radiation at different frequencies. At some nodes, the sensitivity to radiation at a particular frequency may be more critical. In such cases, embodiments in which the EPP measurement at a node is further broken down by frequency of the radiative component can be advantageous. In such embodiments, a different threshold for reporting radiative problems may be used for the different frequencies.

In circuits having many circuit paths, it may be advantageous to limit the computation of EPP to a sub-set of the nodes in one of the circuit paths. As long as the EM simulation is available for all of the metal traces in the circuit, the power on the respective nodes can be used to compute the radiative power on a subset of the nodes.

The present invention also includes a computer readable medium that stores instructions that cause a data processing system to execute the method of the present invention. A computer readable medium is defined to be any medium that constitutes patentable subject matter under 35 U.S.C. 101 and excludes any medium that does not constitute patentable subject matter under 35 U.S.C. 101. Examples of patentable media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following Claims.

What is claimed is:

1. A method for operating a data processing system for estimating radiative contamination in an RF circuit characterized by a plurality of circuit elements connected by metal traces on a circuit board, said method comprising causing said data processing system to:
    receive information specifying a coupled radiation matrix, said coupled radiation matrix specifying a fraction of an RF power at each of said metal traces that is radiated to each of said metal traces in said RF circuit;
    receive a circuit model of said RF circuit with each of said metal traces replaced by a node having no radiated EM energy, said circuit model providing reflection coefficients looking into each circuit element connected to each node and a design power value for that node representing a power at that node when said model is powered by a test signal; and
    generate a coupled power list for at least one node of said circuit model, each entry in said coupled power list comprising a coupled power value indicating a power level received by EM radiation from another of said nodes.

2. The method of claim 1 wherein said coupled radiation matrix is generated from an output of an EM simulator operating on a layout model of said metal traces.

3. The method of claim 1 further comprising causing said data processing system to identify one of said nodes for which a sum of said coupled power values for said one of said nodes is greater than a predetermined fraction of said design power value for that node.

4. The method of claim 1 further comprising causing said data processing system to
    generate a coupled power list for each of said nodes of said circuit model;
    replace said design power value for each of said nodes by a sum of said coupled power values for that node and said design power value for that node; and generate a new coupled power list for at least one node of said circuit model, each entry in said new coupled power list comprising a coupled power value indicating a power level received by EM radiation from another of said nodes.

5. A computer readable medium comprising instructions that cause a data processing system to execute a method for operating said data processing to validate a preproduction circuit comprising a circuit layout on a circuit board prior to the construction of that circuit on said circuit board, said preproduction circuit comprising an RF circuit characterized by a plurality of circuit elements connected by metal traces on a circuit board, said method causing said data processing system to:

receive information specifying a coupled radiation matrix, said coupled radiation matrix specifying a fraction of an RF power at each of said metal traces that is radiated to each of said metal traces in said RF circuit;

receive a circuit model of said RF circuit with each of said metal traces replaced by a node having no radiated EM energy, said circuit model providing reflection coefficients looking into each circuit element connected to each node and a design power value for that node representing a power at that node when said model is powered by a test signal; and generate a coupled power list for at least one node of said circuit model, each entry in said coupled power list comprising a coupled power value indicating a power level received by EM radiation from another of said nodes.

6. The computer readable medium of claim 5 wherein said coupled radiation matrix is generated from an output of an EM simulator operating on a layout model of said metal traces.

7. The computer readable medium of claim 5 wherein said method further comprises causing said data processing system to identify one of said nodes for which a sum of said coupled power values for said one of said nodes is greater than a predetermined fraction of said design power value for that node.

8. The computer readable medium of claim 5 wherein said method further comprises causing said data processing system to generate a coupled power list for each of said nodes of said circuit model;

replace said design power value for each of said nodes by a sum of said coupled power values for that node and said design power value for that node; and generate a new coupled power list for at least one node of said circuit model, each entry in said new coupled power list comprising a coupled power value indicating a power level received by EM radiation from another of said nodes.

* * * * *